United States Patent [19]
Renfrew et al.

[11] 3,797,995
[45] Mar. 19, 1974

[54] POLYESTER TEXTILE FIBERS DYED WITH ALPHA-AMINOANTHRAQUINONE DYES

[75] Inventors: Edgar E. Renfrew; Raouf Botros, both of Lock Haven, Pa.

[73] Assignee: American Aniline Products, Inc., Paterson, N.J.

[22] Filed: Oct. 2, 1972

[21] Appl. No.: 294,161

Related U.S. Application Data
[63] Continuation-in-part of Ser. No. 80,172, Oct. 12, 1970, abandoned.

[52] U.S. Cl. .................. 8/39, 260/380, 260/381
[51] Int. Cl. .................. D06p 3/52, C09b 1/28
[58] Field of Search ............ 8/39 R, 39 C; 260/378, 260/379, 380, 381

[56] References Cited
UNITED STATES PATENTS

2,068,371  10/1936  Buxbaum ........................ 260/380
2,990,413  6/1961  Gehrke ........................... 260/380

FOREIGN PATENTS OR APPLICATIONS

958,925  5/1964  Great Britain ................... 260/380

Primary Examiner—Donald Levy
Assistant Examiner—Bruce H. Hess
Attorney, Agent, or Firm—Armstrong & Wegner

[57] ABSTRACT

Anthraquinone dyes are made by the reaction of anthraquinone intermediates, substituted in each of the alpha positions with a hydroxyl group or an amino group and containing at least one α-amino group, with an aralkyl alcohol, such as benzyl alcohol, in sulfuric acid medium preceded by or followed by halogenation. Synthetic textile fibers, in particular, polyethylene terephthalate fibers, when dyed with the new dyes are colored in blue shades which are substantive, light fast, sublimation resistant and retain their shade well when viewed under different light sources.

8 Claims, No Drawings

POLYESTER TEXTILE FIBERS DYED WITH ALPHA-AMINOANTHRAQUINONE DYES

This application is a continuation-in-part of our now-abandoned co-pending U.S. Pat. application, Ser. No. 80,172, filed Oct. 12, 1970, now abandoned.

BACKGROUND OF THE INVENTION

Aromatic polyester fibers, such as polyethylene terephthalate fibers, do not readily accept the higher molecular weight dyes, which often provide dyeings of superior properties, especially to sublimation. As a result, it is difficult to find dyes of acceptable shade and brightness which, when dyed by conventional methods on for example, polyethylene terephthalate, are acceptable in all of the important physical properties of substantivity, light fastness and resistance to sublimation.

It is known from Buxbaum, U.S. Pat. No. 2,068,371, that diamino-dihydroxyanthraquinones such as 4,8-diaminoanthrarufin can be treated with aralkyl alcohols such as benzyl alcohol at temperatures ranging from 100° to 200° C in the presence of an inert solvent such as nitrobenzene or ortho-dichlorobenzene. The dyes of Buxbaum are known to color cellulose acetate silk in greenish-blue shades of excellent fastness to light. Because the preparative method of Buxbaum is comparatively inefficient, these dyes have never enjoyed great commercial acceptance. Halogenated diamino-dihydroxanthraquinones and the use of these compounds as colors for polyester fibers is taught by Gunter Gehrke in U.S. Pat. No. 2,990,413. The dyes of Gehrke are made by introducing the anthraquinone compound into dilute or concentrated or slightly fuming sulfuric acid or into an inert organic solvent, such as a halo- or nitrobenzene, and adding halogen or a halogenating compound. For halogenation, temperatures up to about 100° C are used. The halogen content of the Gehrke compounds must be controlled between 0.5 and 1.5 moles based on the anthraquinone. The resulting products dye polyester textile materials, such as Dacron, in blue to reddish-blue shades.

We have discovered that superior dyeings of excellent shade and fastness properties can be made on polyester textile materials using certain halogenated anthraquinone dyes made in high yield by a novel process involving the reaction of an anthraquinone intermediate with an aralkyl alcohol and a halogenating agent in a sulfuric acid medium of controlled concentration. Polyester textile material, when dyed according to the present invention, shows properties superior to the goods dyed with the known products of Buxbaum and Gehrke. Furthermore, the tendency of the dyeings of the invention to flare reddish when viewed in artificial light such as that of ordinary incandescent bulbs is much less pronounced than in dyeings from the previously known dyes. This retention of true shade is of great importance in the textile trade, especially for dress goods and fabrics for use in household furnishings.

SUMMARY

In accordance with the invention, aromatic polyester textile fibers are dyed with anthraquinone dyes of the formula:

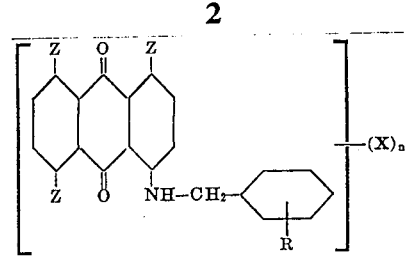

In the above formula, Z is $NH_2$, NHR', OH or

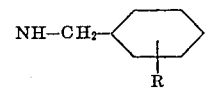

not more than one Z being

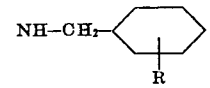

or NHR'. X is either chlorine or bromine and $n$ has a value ranging from 0.5 to 2, preferably 1 to 1.5. R is hydrogen, chlorine, bromine, or lower alkyl. R' is lower alkyl having up to six carbon atoms.

Synthetic polyester textile fiber dyed with such dyes in amounts such that the colored fiber contains about 0.1 – 2 percent by weight dye, show bright blue shades having excellent light and sublimation characteristics as well as good substantivity, and outstanding retention of shade when viewed in artificial light.

The dyes are made from an anthraquinone compound of the formula:

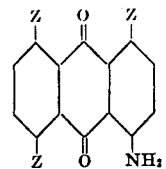

in which Z is $NH_2$ or OH or $OCH_3$. The anthraquinone compound is subjected to reaction with at least one mole and up to 2 moles, per mole of anthraquinone compound, of an aralkyl alcohol of the formula:

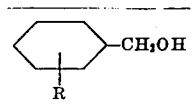

in which R has the meaning given above at a temperature between ambient temperature and 150° C in an aqueous sulfuric acid medium in which the sulfuric acid concentration ranges between 45 and 80 percent by weight. Before or after reaction with the aralkyl alcohol, the reaction mixture is treated with bromine or chlorine in an amount sufficient to provide a reaction product containing 0.5 to 2 atoms of halogen per mole of anthraquinone compound. Up to one α-$NH_2$ group can be converted to NHR', wherein R' is as defined above, by reaction with the appropriate lower aliphatic alcohol. After halogenation and aralkylation are complete, the product dye is recovered from the reaction mixture by conventional means.

DETAILED DESCRIPTION

The dyes for use in the invention are made from readily available α-aminoanthraquinone intermediates. Typical useful intermediates include 4,8-diaminoanthrarufin, 4,5-diaminochrysazin, the commercially available mixture of diaminoanthrarufin and diaminochrysazin, 1,5-diamino-4,8-dimethoxyanthraquinone, 4,5-diamino-1,8-dimethoxyanthraquinone, 1-amino-4,5,8-trihydroxy-anthraquinone, 1,4,5,-8-tetraaminoanthraquinone, 1,4,5-triamino-8-hydroxyanthraquinone and mixtures thereof.

The anthraquinone compound is treated with an aralkyl alcohol of the formula:

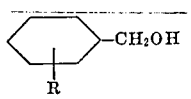

in which R has the meaning given above. Such alcohols include benzyl alcohol or its brominated, chlorinated or lower alkyl substituted derivatives.

The amount of aralkyl alcohol used in the reaction depends upon whether mono- or diaralkylated products are desired. If a monoaralkylated product is desired, the aralkyl alcohol should be present in an amount just slightly in excess of one mole per mole of anthraquinone compound.

In order to obtain high yields of the desired products, the choice of reaction medium is of particular importance. We have discovered that aqueous sulfuric acid having a concentration of 45 to 80 percent by weight, preferably 50–65 percent by weight, provides a medium in which both benzylation and halogenation can be efficiently accomplished. If the concentration of sulfuric acid is below 45 percent by weight the reaction can occur, but in any practical concentration of the anthraquinone intermediate, the mixture is very thick and stirring cannot be carried out efficiently. On the other hand, if the concentration of sulfuric acid is above 80 percent by weight, benzyl alcohol undergoes side reactions to non-useful products, and thus is not available for the desired reaction and also causes contamination of the product.

The reaction with the alcohol is conducted at a temperature ranging between 20° and 130° C. Temperatures in the lower portion of this range are preferred because in the subsequent halogenation step it is desirable, when molecular halogen is used to introduce the halogen at a temperature of 60°–65° C to avoid the loss of volitable halogenating agent. Therefore, preferred reaction temperatures range between 25° to 75° C. At temperatures above 130° C there is a danger of undesirable side reactions.

The time required for aralkylation generally ranges between 20–48 hours, depending on the choice of reactants and the reaction temperature.

Before or after aralkylation, a halogenating agent, which may be liquid bromine or gaseous chlorine is added slowly to the reaction mixture until sufficient halogenating agent is present to provide a final product containing 0.5–2 atoms of halogen per mole of anthraquinone compound. Halogenation is conveniently done at an elevated temperature ranging from between about 60° and 110° C. The reaction is maintained at this temperature until halogenation is complete, which generally requires from about 1½ to 4 hours.

After aralkylation and halogenation are complete, the reaction mass is recovered by conventional means, for example, by pouring over ice or throwing in cold water, stirring, filtering and washing the cake acid-free. To achieve purification, a reslurry step in hot water is often useful.

The dye may be standardized either as a disperse paste or a disperse powder by any of the basic standardizing techniques that have been known to the art for many years; i.e., by the use of appropriate amounts of common dispersants and standardizing agents, usually together with small amounts of anionic wetting agent to assist in dispersion.

Standardized pastes are made by wet milling the dye in conventional equipment in the presence of a dispersing agent, preferably sodium lignin sulfonate or sodium alkylnaphthalene sulfonate. Various other commercially available dispersing agents such as sodium salts of carboxylated polyelectrolytes and the naphthalene sulfonates; e.g., the condensation products of sulfonated naphthalene and formaldehyde, such as sodium dinaphthylmethane disulfonate, are conveniently used. The dispersed paste may be cut or standardized to a standard strength with water. As noted above, any conventional wetting agent, e.g., sodium cetyl sulfonate, may be added to wet out the product. The final color content of the finished paste averages from 10–40 percent by weight (pure color) active dye base.

Standardized dispersed powders are prepared by wet milling color in the presence of a dispersant, such as those mentioned hereabove, in equipment, such as a ball mill, Werner-Pfleiderer mill or attritor. The dispersed material is oven or spray dried and micropulverized if necessary to provide the dispersed powder. The color is cut or standardized to a standard strength in a blender with a diluent, such as sodium sulfate or dextrin. A wetting agent, such as sodium cetyl sulfate or an alkylphenoxy polyethanol may be added to wet out the product. Dispersed powders are usually cut or standardized to 25–60 percent by weight color content (pure color).

The dye, when added to water with or without auxiliary agents, forms a near colloidal aqueous dispersion from which the aromatic polyester fiber or textile material is dyed in the conventional manner at 40°–100° C (104°–212° F) to give a colored fiber containing about 0.01–2 percent by weight dye (100 percent color basis).

Alternatively, dyeing may be accomplished without a carrier at temperatures of 100°–150° C under pressure. Also, the dye may be applied in patterns by conventional printing methods, if desired.

The dye can also be applied to the aromatic polyester fiber by thermofixation methods, such as the "Thermosol" process. This process, which involves padding the cloth with the diluted dye dispersion followed by drying and heating the dried hot air or heated contact rolls, is conveniently used for dyeing polyester fibers and blends containing these fibers. Fixation temperatures of 180°–220° C (ea. 360°–425° F) are used for 30 to 90 seconds. If the fabric contains cotton or viscose rayon, apart from synthetic fibers, there is no danger of damaging cellulosic portions, but if wool is present, the temperature must be kept within 180°–200° C and the time must be reduced to 30 seconds.

In order to evaluate the effectiveness of a particular dye for a given type of fiber, the dyed fiber is examined for substantivity of the color, light fastness of the color, and resistance of the color to sublimation. Specific tests for the evaluation of these important properties are described in the examples that follow with the exception of the "flare" or apparent change in shade of the dyed goods when viewed under different light sources. This test is carried out using standard light sources, but is somewhat subjective; the apparent shade changes are obvious visually but are not ordinarily measured. Comparison with a standard or other dyed fabric is common practice.

Our invention is further illustrated by the following examples.

EXAMPLE 1

A 500 g. quantity of 98 percent sulfuric acid was charged into a liter 4-neck flask equipped with thermometer, stirrer, condenser and a dropping funnel. There was added portionwise below 20° C 27 g. of 4,5-diaminochrysazin (0.1 mole). The mixture was stirred for 1 hour, and thereafter there was added portionwise below 40° C 250 ml. of water to reduce the sulfuric acid concentration to 65 percent by weight. There was then added dropwise during 1 hour 12 g. of benzyl alcohol. After addition was completed, the mixture was stirred at room temperature (25°–30° C) for 40 hours. Then it was heated slowly to 60° C and there was added dropwise at 60°–65° C during 1 hour 19 g. of liquid bromine. The temperature was then raised slowly to 100° C during 2 hours and maintained at 100°–105° C for 2 hours.

Without cooling, the reaction mass was drowned hot into 1,500 ml. of cold water. The mass was stirred for 1 hour, filtered and the cake was washed nearly acid free with hot water. The cake was reslurried in 1,000 ml. of hot water. The mixture was stirred to uniformity and was neutralized to slight alkalinity with dilute caustic soda solution. The temperature was raised to 95° and the mixture was filtered hot. The cake was washed neutral with hot water and was sucked dry. There was thus obtained 210.5 g. of wet cake (38 g. dry content) corresponding to a yield of 86.5 percent of theory of a dye of the formula:

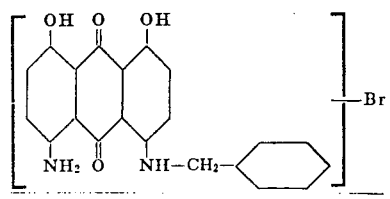

EXAMPLE 2

An aqueous dye bath containing 10 percent Marcron L (a commercially available phenolic dye carrier) and 1 percent monododium phosphate as a buffering agent was prepared. Type 54 Dacron polyester fabric was treated in a bath at 120° F for 10 minutes, the fabric to water dye bath ratio being 1:40. The disperse dye, made by milling the product of Example 1 with an equal weight of a commercially available sodium lignin sulfonate, was added in an amount sufficient to provide a bath containing 0.4 percent dye base based on the weight of polyester fiber. Dyeing was continued for 1 hour at 205° F and the fabric was removed from the bath, rinsed and dried.

Sample dyeings were tested for sublimation according to standard AATCC Color Fastness to Dry Heat (sublimation) Test No. 117–1967T, Page B–74 of the 1967 Technical Manual of the American Assocation of Textile Chemists and Colorists. The dyed fabric was placed between a sandwich of undyed Dacron polyester fabric and heat was applied for 30 seconds. Sublimation tests were made at 350° and 400° F on goods as described above. The dyeing was characterized by a clear blue hue with excellent retention of shade when viewed in various types of light.

Similar excellent results were obtained when the dye was applied to the fabric by the Thermosol process and then tested for sublimation as described above.

The dyeings were also tested for light fastness by subjecting them to carbon arc fading in accordance with AATCC Color Fastness to Light: Carbon Arc Lamp, Continuous Light Test No. 16A–1964. The dyeings showed only a very slight break at 100 hours' exposure indicating superior fastness to light.

EXAMPLE 3

To a 1 liter 4-neck flask equipped with thermometer, stirrer, condenser and dropping funnel, there were charged 250 ml. of water and 500 g. of 98 percent sulfuric acid. There was then added below 25° C 45 g. of a mixture of 4,5-diamino-1,8-dimethoxyanthraquinone and 4,8-diamino-1,5-dimethoxyanthraquinone, totalling 0.15 mole (the ratio of components is between 1:3 and 3:1, and are probably close to 1:1) and 20 g. benzyl alcohol (0.185 mole). The mixture was heated at 125°–130° C for 24 hours. The mass was cooled to 60° C and there was added dropwise at 60°–75° C 28 g. of liquid bromine (0.175 mole).

After the addition was completed, the temperature was raised to 110° C and maintained at 110°/115° C for 3 hours. The mixture was stirred to room temperature overnight, and the mass was then drowned in 1,000 g. of ice and 1,000 ml. of water.

The drowned mass was filtered and the cake was washed nearly acid free with water. The cake was then reslurried in 1,000 ml. of hot water. The mixture was then neutralized to slight alkalinity with a few drops of 50 percent sodium hydroxide. The mass was filtered and the cake was washed alkali free with water and sucked dry. There was thus obtained 375.5 g. of wet cake (58.6 g. dry content) corresponding to a yield of 90 percent of theory the dye of Example 1.

A 10 percent paste was made by the following procedure. To an attritor there was charged 257 g. of wet cake corresponding to 40 g. 100 percent color, 40 g. of Reax 85–A (a commercially available fractionated sodium lignin sulfonate), 103 g. of water and a few drops of Surfynol 120 (a commercially available ditertiary acetylenic glycol surfactant). The mixture was milled until the dispersion test was satisfactory.

When dyed and tested according to the procedure of Example 2, the dyeings were shown to have excellent fastness properties, especially in shade retention under artificial light.

EXAMPLE 4

The procedure of Example 1 was repeated with the exception that 24 g. of benzyl alcohol were used instead of the 12 g. quantity of Example 1. The amount of bromine added was 19 g. There was obtained, on insolubilizing in the manner described, 198 g. of wet cake (42 g. dry content), representing 80 percent of theory of a dye having the formula:

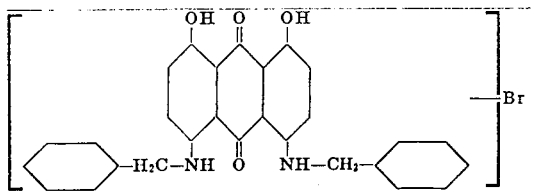

When dyeings were made and tested according to the procedure in Example 2, the dyeings were shown to have excellent fastness properties.

EXAMPLE 5

There was charged into a one liter, 4-neck flask equipped with an agitator, a thermometer and a reflux condenser, 500 g. 98 percent sulfuric acid. There was added below 25° 27 g. (0.1 mole) 4,5-diaminochrysazin. The mixture was stirred for 1 hour, then diluted below 40° C with 480 ml. water, making the concentration 50 percent sulfuric acid. Twelve grams of benzyl alcohol were dropped in at 15°–20° during 1 hour. The mixture was stirred at room temperature (ca. 25° C) for 40 hours. The temperature was raised slowly to 60° and 19 g. bromine were dropped in at 60°–65° during 1½ hour. After the addition was complete, the temperature was raised to 100° during 2 hours and maintained at 100°–105° for 2 hours. The uncooled reaction mixture was drowned into 1,500 ml. cool water, stirred for 1 hour and filtered. The cake was washed nearly acid-free with hot water. It was then reslurried in 1,000 ml. hot water, heated to 80° C and neutralized to slight alkalinity with dilute sodium hydroxide solution. The mixture was filtered hot on a suction filter and the cake was washed neutral with hot water. Suction was maintained until no more water could be pulled from the cake, which was then removed from the filter and preserved as a wet cake. The dye base was dispersed in the usual way and the dispersion applied to polyester fibers according to the procedures described in the previous examples.

Polyethylene terephthalate fabric dyed with the dispersion by any of the established methods was colored bright blue shades. The dyeings showed remarkable fastness to light, and good sublimation fastness. Hue retention under artificial light was particularly good.

EXAMPLE 6

A chemical structure was made from 4,5-diaminochrysazin in the manner described in Example 5, except that p-chlorobenzyl alcohol was used in place of benzyl alcohol. The primary product, 4-amino-5-p-chlorobenzylaminochrysazin, was brominated similarly until one atom of bromine was absorbed. The dye base, isolated in the described manner, was converted to a disperse paste as detailed in Example 3. The paste was applied to polyethylene terephthalate fabric by a thermofixation method.

The properties of the blue-dyed goods were excellent, particularly regarding hue retention under artificial light, and in light fastness and sublimation fastness.

EXAMPLE 7

4-Amino-5-benzylaminochrysazin, achieved in the manner described in Example 1, was treated without isolation with gaseous chlorine instead of liquid bromine. The chlorine was added through a diffusing head under the surface of the reaction mass until an analysis showed that approximately one atom of chlorine per mole of dye base had been absorbed. The dye base was isolated, dispersed and dyed by methods previously described.

Polyester fabric dyed with the product was clear blue, and showed excellent properties when subjected to standard test methods for light and sublimation fastness. Shade retention under artificial light was exceptionally good.

EXAMPLE 8

The procedure of Example 5 was followed, except that an equivalent amount of p-methylbenzyl alcohol was substituted for the benzyl alcohol. Bromination, isolation, dispersion and dyeing were carried out essentially in the manner indicated in Example 5. Properties of dyed polyethylene terephthalate were very like those of the goods achieved by the method of Example 5.

EXAMPLE 9

4,8-Diaminoanthrarufin was treated in the way described in Example 5 for 4,5-diaminochrysazin. Isolation of the dye base, and dispersion were carried out in the same way. Polyester fabric colored with the obtained disperse dye by the established methods of carrier dyeing, pressure dyeing or thermofixation dyeing showed properties similar to those obtained in Example 5. The hue was a somewhat redder shade of blue than the isomer of Example 5. However, the behavior under light from incandescent bulbs was similar in that "red flare" was minimal and not objectionable on esthetic grounds.

EXAMPLE 10

Charged into a 1 liter 4-neck flask equipped with thermometer, stirrer, condenser and a dropping funnel was 250 g. 98 percent sulfuric acid. There was added portionwise below 20° 27 g. diamino chrysazin (0.1 mole). The mixture was stirred for 1 hour, then it was diluted below 40° with 23 ml. water. The mixture was heated to 60° and there was added dropwise at 60°–65° during 3 hours, 19 g. bromine. The temperature was then raised slowly to 100° during 2 hours and maintained at 100–105 for 4 hours. The mixture was allowed to cool to room temperature while introducing nitrogen to remove hydrogen bromide and unreacted bromine. The reaction mass was diluted carefully with 217 ml water. Then there was added 5 g. Tween 20. The mixture was stirred at maximum speed, and there was added dropwise during 2 hours at 15°–20°, 12 g. benzyl alcohol. After addition was completed, the mixture was stirred at room temperature (25°–30°) for 24 hours. The temperature was raised slowly to 100° and maintained at 100°–105° for 6 hours. The reaction mass was drowned hot into 1,500 ml. water. The mixture was stirred for 1 hour, filtered and the cake was washed nearly acid free with hot water. The cake was reslurried in 1,000 ml. hot water. The mixture was stirred and heated to 80°. Then it was neutralized to slight alkalinity with dilute caustic soda solution. Temperature was raised to 95° and maintained for ½ hour. (Check pH for slight alkalinity.) The mixture was filtered hot. The cake was washed neutral with hot water and was sucked dry. Yield: 136.5 g. (wet cake of 32 percent dry content = 43.7 g. actual weight). Th. Yield: 44 g. The cake was not dried.

The corresponding yield is 100 percent of theory of a dye of the formula:

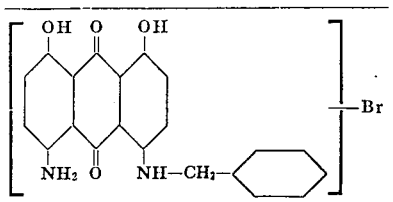

STANDARDIZATION

A 10 percent color content paste was made. Charged to a ball mill was 125 g. wet cake = 40.0 g. 100 percent color, 50 g. Lignosol FTA, 225 ml. water. The mixture was ballmilled until dispersion test was satisfactory.

When dyed and tested according to the procedure of Example 2, the dyeings were shown to have excellent fastness properties, especially in shade retention under artificial light.

EXAMPLE 11

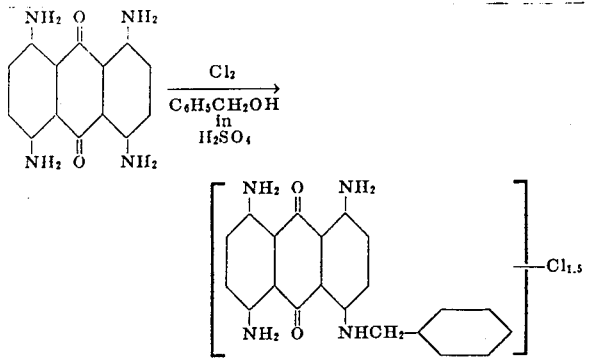

To a 1 liter 4-neck flask equipped with a heater, thermometer, stirrer and reflux condenser was charged 265 g. sulfuric acid, 66° Be. There was added to it portionwise at room temperature 42.5 g. 1,4,5,8-tetraaminoanthraquinone. The temperature was raised to 145° C and stirred at that temperature for 2 hours. The solution was cooled externally to 80° C, at which temperature was added 1.0 g. iodine. There was then introduced below the level of the liquid in the flask over 2 hours at 80°–85°, about 50.0 g. chlorine gas. During this period a stream of nitrogen was led into the space above the liquid to entrain and removed produced hydrogen chloride and unreacted gaseous chlorine. After the addition of the chlorine had been completed, the mixture was cooled externally to 50° C. It was then diluted with 233.0 ml. cold water, the addition and cooling being carried out at such a rate that the internal temperature did not exceed 50° C. The temperature was lowered to 15°–20° C by external cooling, and at this temperature there was added 18.0 g. benzyl alcohol. Stirring was continued for twenty hours, during which time the temperature was allowed to rise to that of the surroundings. After the 20 hour period, the temperature was raised over 2 hours to 100°–105° C and the mixture stirred at this temperature for 6 hours. The reaction mass was drowned without cooling into a mixture of 2,000 g. water and ice. The material which settled was isolated by filtration and washed on the filter to remove most of the sulfuric acid. The cake was stirred with 1,000 ml water, and enough dilute sodium hydroxide was added to make the mixture slightly alkaline. Stirring was continued for 1 hour. The solid was isolated by filtration and washed with water until the washings were no longer alkaline. The cake was sucked on the filter to remove most of the water. Yield (dry content): 52 g.

Cl content: 14.1 percent about 1.5 atoms/mole of anthraquinone

A dispersion was prepared by grinding a portion of the above moist cake with a suitable dispersing agent (as lignosulfonic acid sodium salt) and water in a ball mill. The amounts of anthraquinone material (dry content), dispersing agent, and water were in the proportion 1:1:8. The resultant paste was used to prepare dyebaths by the usual methods established for dyeing polyester fabrics, carrier, pressure or thermofix. Dyeings were a clear blue hue with good light and sublimation properties, and with an absence of red flare in artificial light.

EXAMPLE 12

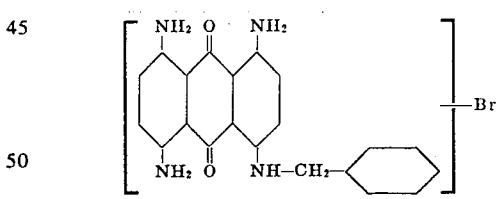

Charged into a 500 ml, 4-neck flask equipped with thermometer, stirrer and reflux condenser 265 g. 66° Be sulfuric acid. There was added in small portions 40 g. 1,4,5,8-tetraaminoanthraquinone. The mixture was stirred at 145° C for 2 hours. Then the mass was cooled to 80° C, at which temperature was added 0.5 g. iodine. There was added dropwise during 2 hours at 80° C 25 g. bromine. The mixture was heated to 100° C during 2 hours and maintained at 100°–105° C for 4 hours. Nitrogen was introduced to remove hydrogen bromide and unreacted bromine. The reaction mixture was cooled in a water bath and diluted below 50° C with 233 ml. water which contains 5 g. "Tween 20"

(polyoxyethylene sorbitan monolaurate). Then there was added during one hour at 15°–20° C 18 g. benzyl alcohol. The reaction was completed as described for the chlorobenzylated derivative. Yield = 58.2 g. When dispersed and dyed as described in Example 11, the properties and shade were substantially the same as those obtained in Example 11.

EXAMPLE 13

If the procedure of Example 11 is repeated with the addition of one mole of methyl alcohol to the reaction mixture, the product dyes a clear blue shade which is somewhat greener in hue than the dyeings of Example 11.

We claim:

1. Synthetic polyester textile fibers dyed with a dye of the formula:

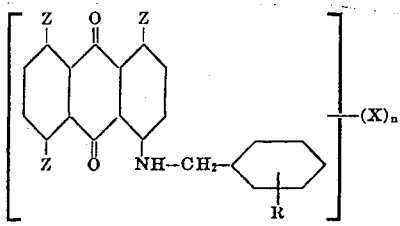

wherein Z is $NH_2$, $NHR'$, OH or

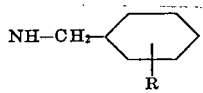

not more than one Z being

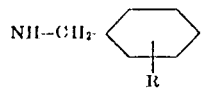

or $NHR'$, X is a member selected from the group consisting of Cl and Br, $n$ has a value of 0.5–2, R is a member selected from the group consisting of hydrogen, Cl, Br, and lower alkyl and $R'$ is lower alkyl.

2. The dyed product of claim 1 wherein the synthetic polyester textile fibers is polyethylene terephthalate.

3. A dyed product of claim 1 wherein the Z terms are $NH_2$, OH and OH, X is Br, R is hydrogen and $n$ is 1–1.5.

4. A dyed product of claim 1 wherein the Z terms are $NH_2$, X is Cl, R is hydrogen and $n$ is 1–1.5.

5. A dyed product of claim 1 wherein the Z terms are $NH_2$, X is Br, R is hydrogen and $n$ is 1–1.5.

6. Synthetic polyester textile fibers dyed with a compound of the formula

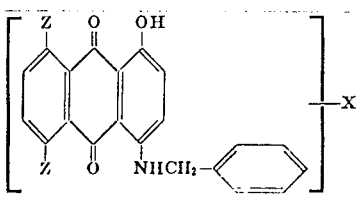

wherein one Z is hydroxy and the other Z is amino; and X is chlorine or bromine.

7. The synthetic polyester textile fibers of claim 6 wherein X is chlorine.

8. The synthetic polyester textile fibers of claim 6 wherein X is bromine.

* * * * *